United States Patent
Wu et al.

(10) Patent No.: US 12,354,758 B2
(45) Date of Patent: Jul. 8, 2025

(54) CONTROL SYSTEM AND METHOD FOR HEAT SUPPLY APPARATUS OF NUCLEAR POWER PLANT

(71) Applicants: SHANDONG NUCLEAR POWER COMPANY LTD., Shandong (CN); STATE NUCLEAR ELECTRIC POWER PLANNING DESIGN & RESEARCH INSTITUTE CO., LTD, Beijing (CN)

(72) Inventors: Fang Wu, Shandong (CN); Fei Liu, Shandong (CN); Guobin Xu, Shandong (CN); Bingzhuo Zhang, Shandong (CN); Jianwei Li, Shandong (CN); Zhibin Zhu, Shandong (CN); Xiangyu Wang, Shandong (CN); Xiangyang Cai, Shandong (CN); Yongfeng Zhou, Shandong (CN); Da Song, Shandong (CN); Zhaokai Xing, Shandong (CN); Hongjun Xie, Shandong (CN); Shanshan Wang, Shandong (CN); Jinfeng Yang, Shandong (CN); Xiang Huang, Shandong (CN)

(73) Assignees: SHANDONG NUCLEAR POWER COMPANY LTD., Shandong (CN); STATE NUCLEAR ELECTRIC POWER PLANNING DESIGN & RESEARCH INSTITUTE CO., LTD, Beijing (CN)

( * ) Notice: Subject to any disclaimer, the term of this patent is extended or adjusted under 35 U.S.C. 154(b) by 0 days.

(21) Appl. No.: 18/838,417
(22) PCT Filed: Feb. 15, 2023
(86) PCT No.: PCT/CN2023/076173
§ 371 (c)(1),
(2) Date: Aug. 14, 2024
(87) PCT Pub. No.: WO2023/160444
PCT Pub. Date: Aug. 31, 2023

(65) Prior Publication Data
US 2025/0111958 A1   Apr. 3, 2025

(30) Foreign Application Priority Data
Feb. 24, 2022  (CN) .......................... 202210169686.1

(51) Int. Cl.
*G21D 3/08* (2006.01)
(52) U.S. Cl.
CPC .................................. *G21D 3/08* (2013.01)
(58) Field of Classification Search
CPC .. G21D 3/08; G21D 1/00; G21D 5/00; G21D 3/00
See application file for complete search history.

(56) References Cited

U.S. PATENT DOCUMENTS

| | | | | |
|---|---|---|---|---|
| 3,919,720 A | * | 11/1975 | Alliston | G09B 9/00 434/218 |
| 3,936,885 A | * | 2/1976 | Mutafelija | G09B 9/00 434/218 |

(Continued)

FOREIGN PATENT DOCUMENTS

| | | |
|---|---|---|
| CN | 106014514 A | 10/2016 |
| CN | 106246251 A | 12/2016 |

(Continued)

OTHER PUBLICATIONS

English Translation CN 106703904 A (Year: 2017).*

(Continued)

*Primary Examiner* — Shafiq Mian
(74) *Attorney, Agent, or Firm* — Studebaker Brackett PLLC

(57) ABSTRACT

Provided in the present disclosure is a control system for a heat supply apparatus of a nuclear power plant, comprising: a first-stage pressure measurement means configured for measuring a first-stage pressure of a turbine to obtain a first-stage pressure signal; a high-exhaust pressure measurement means configured for measuring an exhaust pressure of (Continued)

a turbine high-pressure cylinder to obtain an exhaust pressure signal; a steam extraction heating flow rate measurement means configured for measuring a steam extraction heating flow rate to obtain a steam extraction heating flow rate signal; a data acquisition module configured for acquiring and transmitting the measured first-stage pressure signal, the measured exhaust pressure signal and the measured steam extraction heating flow rate signal to a core operation processing module; the core operation processing module; and a the signal output module.

13 Claims, 10 Drawing Sheets

(56) References Cited

U.S. PATENT DOCUMENTS

| | | | | |
|---|---|---|---|---|
| 4,042,813 | A | * 8/1977 | Johnson | G09B 9/00 |
| | | | | 434/218 |
| 9,677,429 | B2 | * 6/2017 | Kitzmann | F01K 3/004 |
| 2018/0094549 | A1 | * 4/2018 | Zhang | F01K 9/003 |

FOREIGN PATENT DOCUMENTS

| | | | |
|---|---|---|---|
| CN | 106326534 A | | 1/2017 |
| CN | 106703904 A | * | 5/2017 |
| CN | 108825316 A | | 11/2018 |
| CN | 208040466 U | | 11/2018 |
| CN | 113357689 A | | 9/2021 |
| CN | 113361107 A | | 9/2021 |
| CN | 114233423 A | | 3/2022 |
| GB | 967493 A | | 8/1964 |

OTHER PUBLICATIONS

International Search Report issued in PCT/CN2023/076173; mailed May 5, 2023.

"Notification of the First Office Action" Office Action issued in CN 202210169686.1; mailed by the State Intellectual Property Office of the People's Republic of China on Apr. 2, 2022.

"Notification on Grant of Patent Right for Invention" Office Action issued in CN 202210169686.1; mailed by the State Intellectual Property Office of the People's Republic of China on Apr. 19, 2022.

* cited by examiner

CONTROL SYSTEM AND METHOD FOR HEAT SUPPLY APPARATUS OF NUCLEAR POWER PLANT

CROSS-REFERENCE TO RELATED APPLICATIONS

The present application is proposed based on Chinese Patent Application No. 202210169686.1 filed on Feb. 24, 2022, claiming the benefit of the same, and the entire disclosures of which is expressly incorporated by reference herein.

FIELD OF THE INVENTION

The present disclosure relates to the field of nuclear energy heat supply technology, and in particular, to a control system and method for a heat supply apparatus of a nuclear power plant.

BACKGROUND OF THE INVENTION

Centralized heating systems have been adopted widespreadly in urban areas of China, and energy source for heating energy is dominated still by fossil energy, making it difficult to avoid the environmental impact of carbon oxide emissions. Nuclear energy, as a clean, efficient and stable energy source, may continuously supply heat to users, and heat supply from nuclear energy is gradually becoming another form of energy supply from nuclear energy.

At present, a heat supply system of the nuclear power plant regulates steam extraction heating parameters through manual operation. Changes in steam extraction amount also involve a synchronization regulation of a turbine high-pressure cylinder exhaust pressure (referred to as high-exhaust pressure for short hereinafter) and the electrical load, where the stability of the high-exhaust pressure is directly related to the safe operation of the turbine, and the electrical load directly affects the power generation efficiency of the nuclear power plant. Therefore, it is crucial whether the regulation of the steam extraction amount for heating meets the requirements. If the regulation of steam extraction amount is performed manually, it is needed to synchronously monitor and adjust multiple parameters such as the steam extraction amount, the high-exhaust pressure, and electrical load when the heat supply load fluctuates, which may increase the operational burden on operators and the probability of human error. Additionally, the compliance of various parameters needed to be checked before the manual operation, and a larger operational time delay and a slow system response may occur by the regulation of the thermoelectric load, thereby resulting in partial loss of power generation and potential risks to the safe and stable operation of the unit. Meanwhile, in a normal operating mode of the heat supply apparatus of the nuclear power plant (non-heating season), the turbine operates under a pure condensation operation condition. A coordination operation of the reactor and turbine load (referred to as reactor-turbine coordination for short hereinafter) is generally achieved through automatically tracking a first-stage pressure of the turbine (representing a turbine load) by a reactor power control system based on a function curve of the turbine load with the first-stage pressure. When the steam extraction heating is put into operation, a correspondence curve between the turbine load and the first-stage pressure will shift with different heating steam extraction amounts. When maintaining the operating upon the function curve of the turbine load with the first-stage pressure under the original pure condensation operation condition, a load matching error may occur in the reactor-turbine coordination operation, where the larger the steam extraction amount is, the greater the error caused is, affecting the stability of the reactor system (primary loop) operating parameters and further potentially having adverse effects on the safe and stable operation of the entire nuclear power unit.

SUMMARY OF THE INVENTION

An embodiment of a first aspect of the present disclosure proposes a control system for a heat supply apparatus of a nuclear power plant, including:

a first-stage pressure measurement means configured for measuring a first-stage pressure of a turbine to obtain a first-stage pressure signal;

a high-exhaust pressure measurement means configured for measuring an exhaust pressure of a turbine high-pressure cylinder to obtain an exhaust pressure signal;

a steam extraction heating flow rate measurement means configured for measuring a steam extraction heating flow rate to obtain a steam extraction heating flow rate signal;

a data acquisition module configured for acquiring and transmitting the measured first-stage pressure signal, the measured exhaust pressure signal and the measured steam extraction heating flow rate signal to a core operation processing module;

the core operation processing module configured for receiving the first-stage pressure signal, the exhaust pressure signal and the steam extraction heating flow rate signal transmitted from the data acquisition module, and generating an action instruction for each of valves in the heat supply apparatus based on the first-stage pressure signal, the exhaust pressure signal and the steam extraction heating flow rate signal or determining the turbine load value using the received signal, and transmitting the action instruction or the turbine load value to a signal output module;

the signal output module configured for receiving and transmitting the action instruction or the turbine load value from the core operation processing module to a field equipment for control.

Embodiments of a second aspect of the present disclosure propose a control method for a heat supply apparatus of a nuclear power plant, including:

acquiring a measured first-stage pressure signal of a turbine, a measured exhaust pressure signal of a turbine high-pressure cylinder, and a measured steam extraction heating flow rate signal and a steam extraction heating flow rate set value and a high-exhaust pressure set value corresponding to a heat network load demand;

determining a deviation of the steam extraction heating flow rate signal from the steam extraction heating flow rate set value using the steam extraction heating flow rate set value and the steam extraction heating flow rate signal, respectively. and determining a deviation of the steam extraction pressure signal of the turbine high-pressure cylinder from the steam extraction pressure set value using the high-exhaust pressure set value and the exhaust pressure signal;

controlling a steam extraction fast control valve, a turbine low-pressure cylinder interceptor valve and a turbine high-pressure cylinder inlet governing valve, respectively, based on the deviations and the steam extraction heating flow rate signal.

Embodiments of a third aspect of the present disclosure propose a further control method for a heat supply apparatus of a nuclear power plant. including
- acquiring the first-stage pressure signal and the steam extraction heating flow rate signal by a data acquisition module and pre-processing the acquired the first-stage pressure signal and the acquired steam extraction heating flow rate signal;
- selecting a load curve matching with the heating steam extraction flow rate and determining a turbine load value based on the pre-processed first-stage pressure signal and the pre-processed steam extraction heating flow rate signal;
- regulating a power of a reactor by a reactor power control system based on the turbine load value.

Additional aspects as well as advantages of the present disclosure will be given, in part. in the following description. in part as will become apparent from the following description, or as will be learned through the practice of the present disclosure.

BRIEF DESCRIPTION OF THE DRAWINGS

The foregoing and/or additional aspects of the present disclosure, as well as advantages, will become apparent and readily understood from the following description of embodiments in conjunction with the accompanying drawings, wherein.

Figure 1:
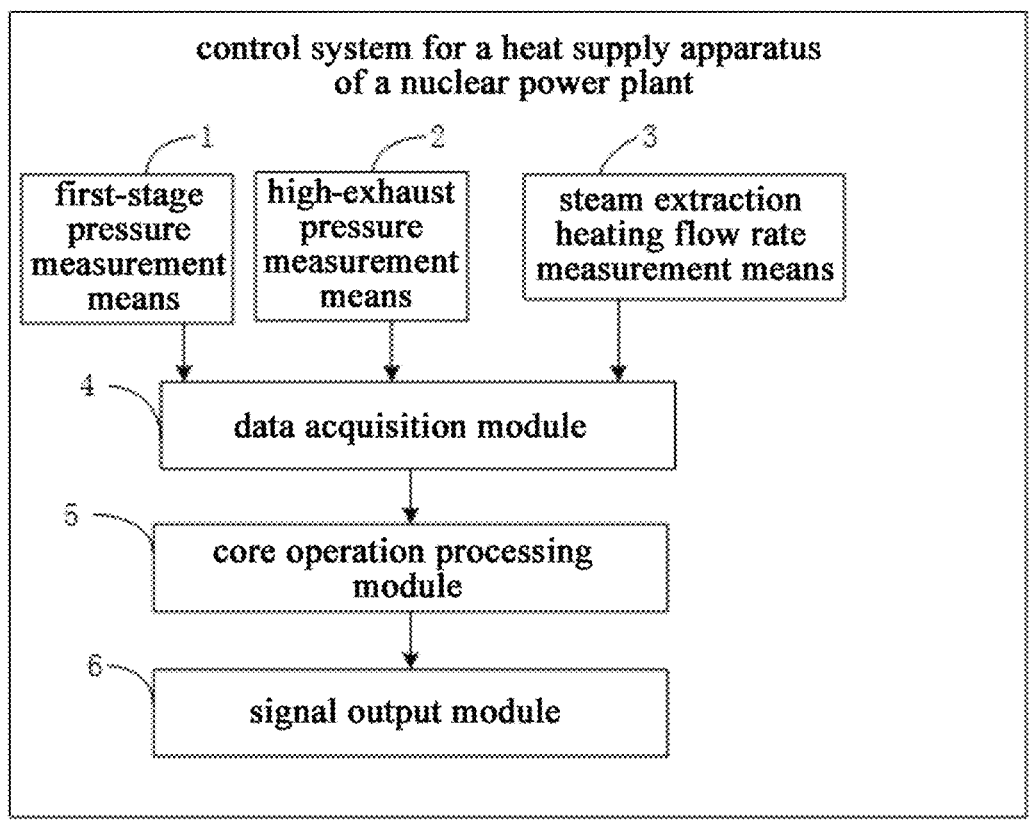
FIG. 1 is a diagram illustrating a structure of a control system for a heat supply apparatus of a nuclear power plant provided according to an embodiment of the present disclosure.

LIST OF REFERENCE SIGNS first-stage pressure measurement means 1, high-exhaust pressure measurement means 2, steam extraction heating flow rate measurement means 3, data acquisition module 4, core operation processing module 5, signal output module 6, human-machine interface processing module 7, turbine controller 8, nuclear island steam generator 9, turbine high-pressure cylinder inlet governing valve (GV) 10, turbine low-pressure cylinder interceptor valve (ICV) 11, steam extraction fast control valve (FCV) 12, heat network heater 13, reactor power control system 14, nuclear reactor 15, steam extraction flow rate set value generation module 501, heating flow rate automatic regulator module 502, manual automatic module 503, override control module 504, high-exhaust pressure set value generation module 505, first pressure-ratio low-pass threshold module 506, second pressure-ratio low-pass threshold module 507, override function triggering condition module 508, override processing module 509, high-exhaust pressure regulator module 510, feed-forward module 511, heating flow rate load compensation algorithm module 512, first curve module 513, second curve module 514, third curve module 515, first switching module 516, second switching module 517, first flow rate threshold module 518, second flow rate threshold module 519, heating startup/shutdown instruction processing module 520, first input port 441, second input port 442, first control port 443, third input port 451, fourth input port 452, and second control port 453.

DETAILED DESCRIPTION OF THE EMBODIMENTS

Embodiments of the present disclosure are described in detail below, and examples of the embodiments are shown in the accompanying drawings, wherein the same or similar reference signs throughout indicate the same or similar elements or elements having the same or similar functions. The embodiments described below with reference to the accompanying drawings are exemplary and are intended for explaining the present disclosure and are not construed as limiting the present disclosure.

The present disclosure proposes a control system and method for a heat supply apparatus of a nuclear power plant, the system including: a first-stage pressure measurement means 1, a high-exhaust pressure measurement means 2, a steam extraction heating flow rate measurement means 3, a data acquisition module 4, a core operation processing module 5, a signal output module 6, and a human-machine interface processing module 7, Based on the above means and modules, action instructions for a steam extraction fast control valve (FCV) 12, a turbine high-pressure cylinder inlet governing valve (GV) 10 and a turbine low-pressure cylinder interceptor valve (ICV) 11 are generated, and/or a turbine load value is determined, and then the field equipment is controlled based on the action instructions and/or the turbine load value. The technical solution provided by the present disclosure optimizes and improves a control method for the manual heat supply apparatus, realizes the intelligent regulation of the system equipment related to the heating steam extraction, may improve automation of the system and reduce human errors, and meanwhile, by the non-disturbance switching of the multiple operation control curves, the disturbance of loop parameters due to the change in turbine loads during the heating operation may be avoided, so as to improve the safety and reliability of the operation of a nuclear power unit during the heat supply.

The control system and method for a heat supply apparatus of a nuclear power plant according to an embodiment of the present disclosure are described below with reference to the accompanying drawings.

EXAMPLE 1

FIG. 1 is a diagram illustrating a structure of a control system for a heat supply apparatus of a nuclear power plant provided by an embodiment of the present disclosure. As shown in FIG. 1, the system includes: a first-stage pressure measurement means 1, a high-exhaust pressure measurement means 2, a steam extraction heating flow rate measurement means 3, a data acquisition module 4, a core operation processing module 5, and a signal output module 6.

The first-stage pressure measurement means 1 is configured to measure a first-stage pressure of a turbine to obtain a first-stage pressure signal.

The high-exhaust pressure measurement means 2 is configured to measure an exhaust pressure of a turbine high-pressure cylinder to obtain an exhaust pressure signal.

The steam extraction heating flow rate measurement means 3 is configured to measure a steam extraction heating flow rate to obtain a steam extraction heating flow rate signal.

The data acquisition module 4 is configured to acquire the measured first-stage pressure signal, exhaust pressure signal and steam extraction heating flow rate signal, and transmit the acquired first-stage pressure signal, exhaust pressure signal and steam extraction heating flow rate signal to the core operation processing module 5.

The core operation processing module 5 is configured to receive the first-stage pressure signal, the exhaust pressure signal and the steam extraction heating flow rate signal transmitted from the data acquisition module, generate an action instruction for each valve in the heat supply apparatus based on the first-stage pressure signal, the exhaust pressure signal and the steam extraction heating flow rate signal or determine the turbine load value using the received signal, and transmit the action instruction or turbine load value to the signal output module 6.

The signal output module 6 is configured to receive the action instruction or turbine load value from the core operation processing module and transmit the action instruction or turbine load value to a field equipment for control.

Figure 2:
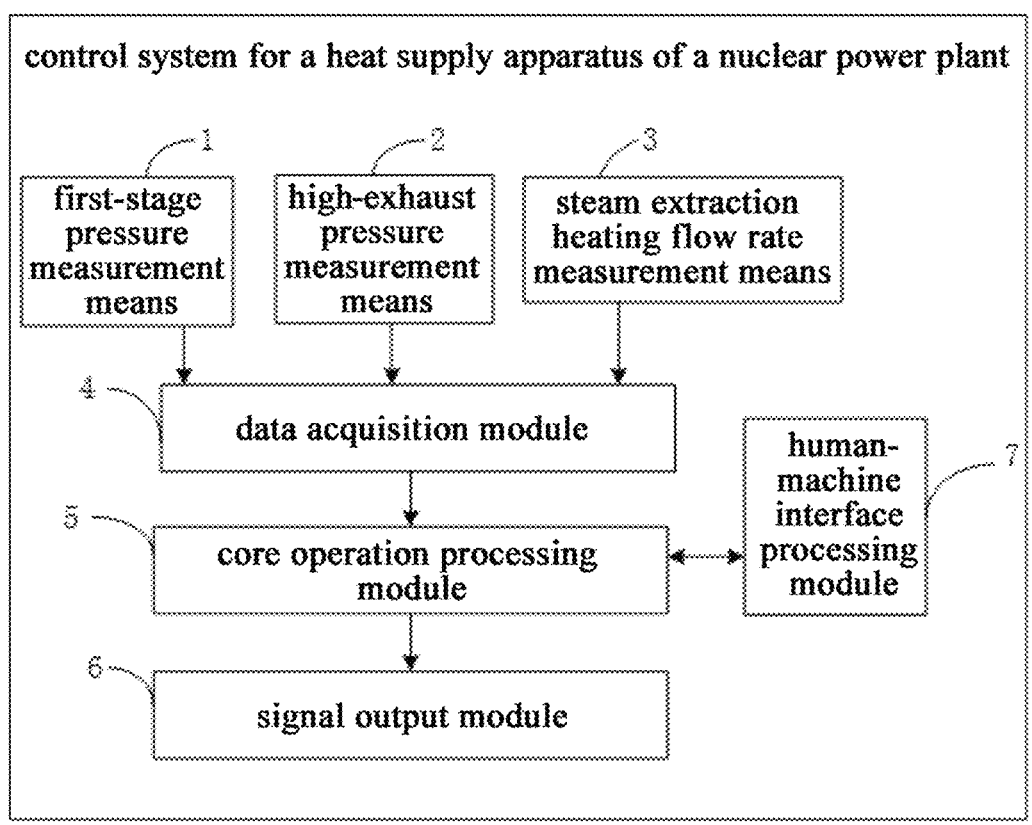
FIG. 2 is a diagram illustrating a structure of a control system for a heat supply apparatus of a nuclear power plant provided according to an embodiment of the present disclosure.

In embodiments of the present disclosure, as shown in FIG. 2, the control system for the heat supply apparatus of the nuclear power plant further includes: a human-machine interface processing module 7.

The human-machine interface processing module 7 is configured to perform information interaction with the core operation processing module 5, wherein the information interaction includes: manual operation, set value input, signal display, alarm processing and function startup/shutdown during core operation processing.

It is to be noted that before generating the action instruction for each valve in the heat supply apparatus based on the first-stage pressure signal, the exhaust pressure signal and the steam extraction heating flow rate signal and/or determining the turbine load value using the received signals, the received first-stage pressure signal, exhaust pressure signal and steam extraction heating flow rate signal is preprocessed;

wherein the pre-processing includes: performing two-out-of-three redundancy processing on the first-stage pressure signal, the exhaust pressure signal and the steam extraction heating flow rate signal acquired by multiple channels, respectively, and determining whether a range corresponding to the acquired signal exceeds a preset range and whether a value of the acquired signal is greater than a preset signal threshold, where an alarm signal is transmitted to the human-machine interface processing module 7 when the range corresponding to the acquired signal exceeds the preset range or the value of the acquired signal is greater than the preset signal threshold.

Figure 3:
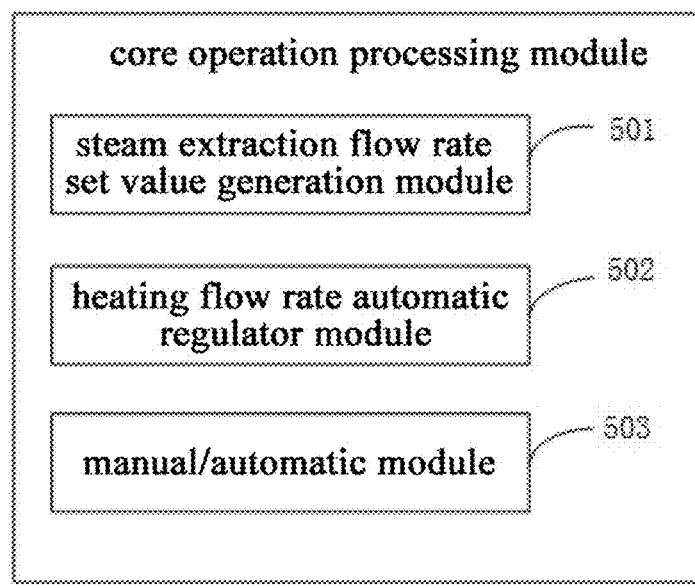
FIG. 3 is a diagram illustrating a first structure of a core operation module in a control system of a heat supply apparatus of a nuclear power plant provided according to an embodiment of the present disclosure.

In an embodiment of the present disclosure, as shown in FIG. 3, the core operation processing module 5 includes: a steam extraction flow rate set value generation module 501, a heating flow rate automatic regulator module 502, and a manual/automatic module 503.

The steam extraction flow rate set value generation module 501 is configured to transmit a flow rate set value preset according to a heat network load demand or a set value given by an operator through the human-machine interface module, to a heating flow rate automatic regulator module 502.

The heating flow rate automatic regulator module 502 is configured to receive the set value transmitted from the steam extraction flow rate set value generation module 501 and determine a deviation of the measured steam extraction heating flow rate from the set value, and then perform a PID (proportional integral-differential) operation based on the deviation and transmit an operation result to the manual/automatic module 503.

The manual/automatic module 503 is configured to receive the operation result transmitted from the automatic heating flow rate regulator module 502 and control a steam extraction fast control valve (FCV) 12 in the heat supply apparatus based on the operation result.

Figure 4:
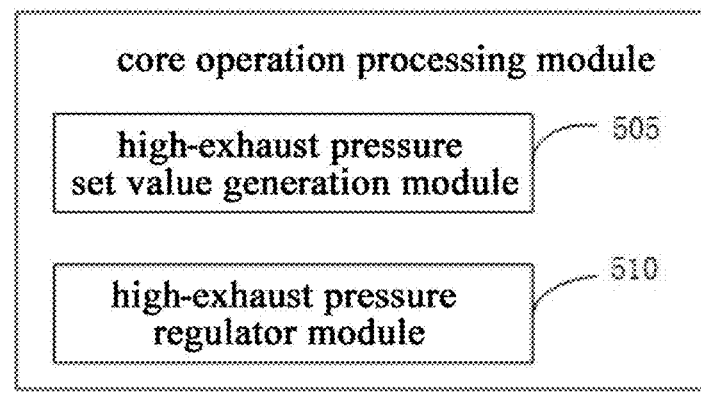
FIG. 4 is a diagram illustrating a second structure of a core operation module in a control system of a heat supply apparatus of a nuclear power plant provided according to an embodiment of the present disclosure.

In embodiments of the present disclosure, as shown in FIG. 4, the core operation processing module 5 further includes: a high-exhaust pressure set value generation module 505 and a high-exhaust pressure regulator module 510.

The high-exhaust pressure set value generation module 505 is configured to transmit a high-exhaust pressure set value preset according to the heat network load demand or given by the operator through the human-machine interface module to the high-exhaust pressure regulator module 510.

The high-exhaust pressure regulator module 510 is configured to receive the measured exhaust pressure of the turbine high-pressure cylinder and the set value of the exhaust pressure transmitted from the high-exhaust pressure set value generation module 505, and determine a deviation of the measured exhaust pressure from the set value, and then perform a PID operation according to the deviation to obtain an operation result, and control the turbine low-pressure cylinder interceptor valve (ICV) 11 based on the operation result.

Figure 5:
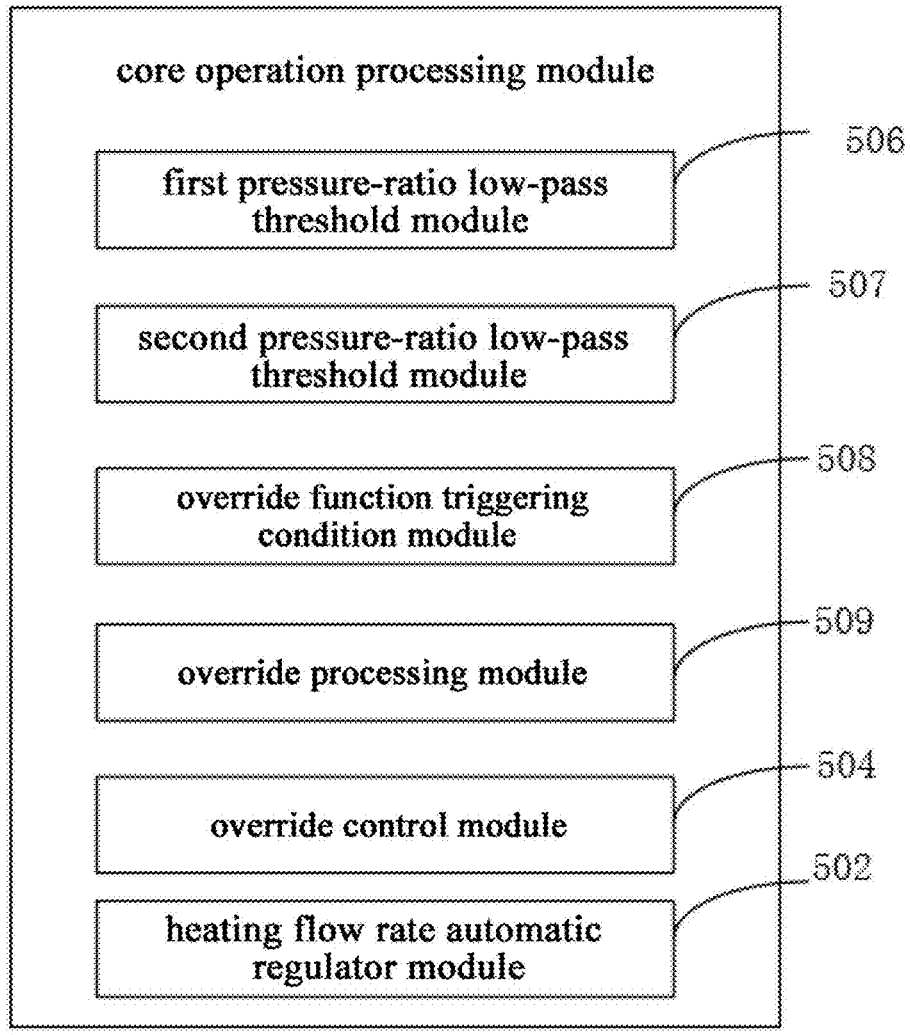
FIG. 5 is a diagram illustrating a third structure of a core operation module in a control system of a heat supply apparatus of a nuclear power plant provided according to an embodiment of the present disclosure.

In embodiments of the present disclosure, as shown in FIG. 5, the core operation processing module 5 further includes: a first pressure-ratio low-pass threshold module 506, a second pressure-ratio low-pass threshold module 507, an override function triggering condition module 508, an override processing module 509, and an override control module 504.

The first pressure-ratio low-pass threshold module 506 is configured to compare a ratio of the measured exhaust pressure of the turbine high-pressure cylinder to a measured first-stage pressure signal with a preset first pressure-ratio threshold, and transmits a signal for closing the steam extraction fast control valve (FCV) 12 to the heating flow rate automatic regulator module 502 when the ratio of the measured exhaust pressure of the turbine high-pressure cylinder to the measured first-stage pressure signal is greater than the preset first pressure-ratio threshold, to realize a slow close of the steam extraction fast control valve (FCV) 12.

The second pressure-ratio low-pass threshold module 507 is configured to compare the ratio of the measured exhaust pressure of the turbine high-pressure cylinder to the measured first-stage pressure signal with a preset second pressure-ratio threshold, and transmits a signal for closing the steam extraction fast control valve (FCV) 12 to the override processing module 509 when the ratio of the measured exhaust pressure of the turbine high-pressure cylinder to the measured first-stage pressure signal is greater than the preset second pressure-ratio threshold, to realize a quick close of the steam extraction fast control valve (FCV) 12.

The override processing module 509 is configured to transmit a control instruction to the override control module 504 when receiving a signal transmitted from the override function triggering condition module 508, wherein an override function triggering condition includes: heating shutdown, turbine trip, and OPC action;

The override control module 504, arranged at an input end of the steam extraction fast control valve (FCV) 12, is configured to receive the control instruction transmitted from the override processing module 509 and control the quick close of the steam extraction fast control valve (FCV) 12 based on the control instruction.

The first pressure-ratio low-pass threshold module 506 and the second pressure-ratio low-pass threshold module 507 have different set values, with the latter being lower and more harmful than the former. When the first pressure-ratio low-pass threshold module 506 transmits a close signal to the heating flow rate automatic regulator module 502, if the slow close action of the steam extraction fast control valve (FCV) 12 does not prevent the pressure-ratio from further decrease, the second pressure-ratio low-pass threshold module 507 may be triggered to quickly and protectively close the steam extraction fast control valve (FCV) 12 through the override processing module 509 and the override control module 504. In addition, it is to be noted that when the second pressure-ratio low-pass threshold module 507 is activated, the first pressure-ratio low-pass threshold module 506 may also remain in an activation state until the pressure ratio is greater than the set value of the threshold module itself.

Figure 6:
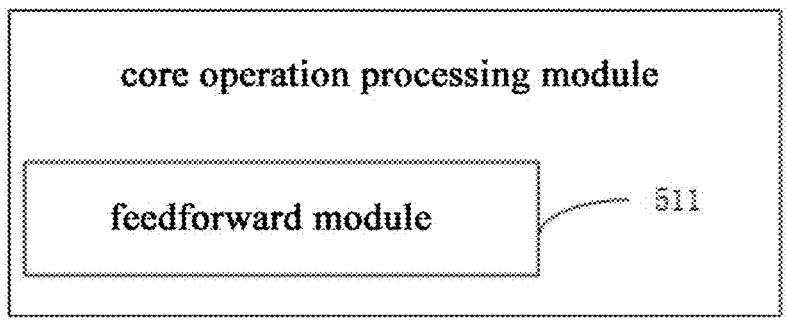
FIG. 6 is a diagram illustrating a fourth structure of a core operation module in a control system of a heat supply apparatus of a nuclear power plant provided according to an embodiment of the present disclosure.

In embodiments of the present disclosure, as shown in FIG. 6, the core operation processing module 5 further includes: a feedforward module 511.

The feedforward module 511 is configured to react in advance to changes in the measured steam extraction heating flow rate and to accelerate a response of the turbine low-pressure cylinder interceptor valve (ICV) 11.

Figure 7:
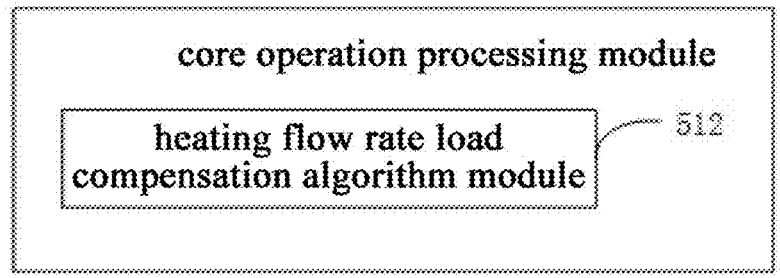
FIG. 7 is a diagram illustrating a fifth structure of a core operation module in a control system of a heat supply apparatus of a nuclear power plant provided according to an embodiment of the present disclosure.

In embodiments of the present disclosure, as shown in FIG. 7, the core operation processing module 5 further includes: a heating flow rate load compensation algorithm module 512.

The heating flow rate load compensation algorithm module 512 is configured to calculate and generate an electric load control instruction, for automatically increasing or decreasing an electric load of the unit while a regulation of a heat supply amount is realized with a total turbine load remaining unchanged.

Wherein the heating flow rate load compensation algorithm module 512 outputs an electrical load increasing or decreasing instruction to a turbine controller 8 to modulate the turbine high pressure control valve (GV) 10 to realize the regulation of the electrical load of the unit.

Figure 8:
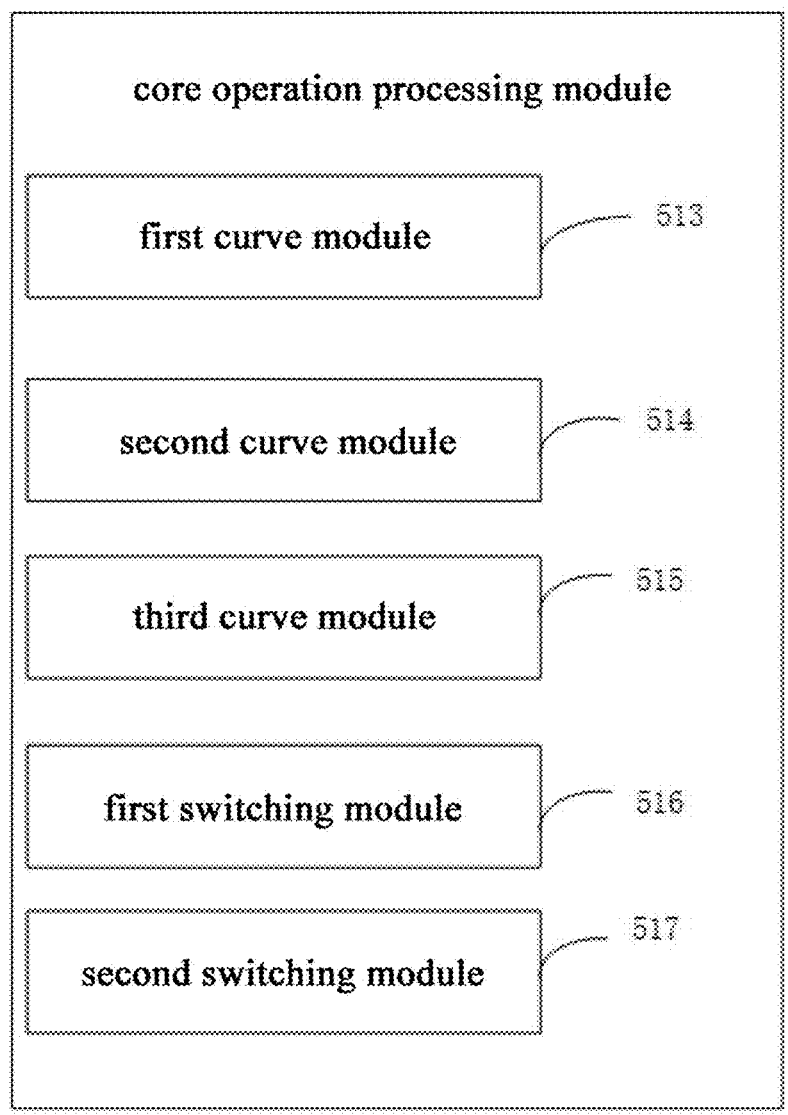
FIG. 8 is a diagram illustrating a sixth structure of a core operation module in a control system of a heat supply apparatus of a nuclear power plant provided according to an embodiment of the present disclosure.

In embodiments of the present disclosure, as shown in FIG. 8, the core operation module 5 further includes: a first curve module 513, a second curve module 514, a third curve module 515, a first switching module 516, and a second switching module 517.

The first curve module 513, in which a pre-obtained load curve 1 is set, is configured to determine a turbine load value corresponding to the measured first-stage pressure based on the load curve 1.

The second curve module 514, in which a pre-obtained load curve 2 is set, is configured to determine the turbine load value corresponding to the measured first-stage pressure based on the load curve 2.

The third curve module 515, in which a pre-obtained load curve 3 is set, is configured to determine the turbine load value corresponding to the measured first-stage pressure based on the load curve 3.

The first switching module 516 is configured to receive a switching signal and perform a switching between the pre-obtained load curve 1 and the pre-obtained load curve 2.

The second switching module 517 is configured to receive a switching signal and perform a switching between the pre-obtained load curve 2 and the pre-obtained load curve 3.

Wherein a number of the load curves is determined based on the types of operation conditions of the heating steam extraction flow rate, wherein the pre-obtained curves 1, 2 and 3 are plotted with a reactor power as a horizontal coordinate and the first-stage pressure as a vertical coordinate.

It is to be noted that the first switching module 516 and second switching module 517 are also configured for realizing mutual automatic tracking of the load curves before and after the switching.

A number of the flow rate threshold modules corresponds to a number of switching modules.

Wherein the number of the flow rate threshold modules is determined based on the types of the operation conditions of the heating steam extraction flow rate.

Figure 9:
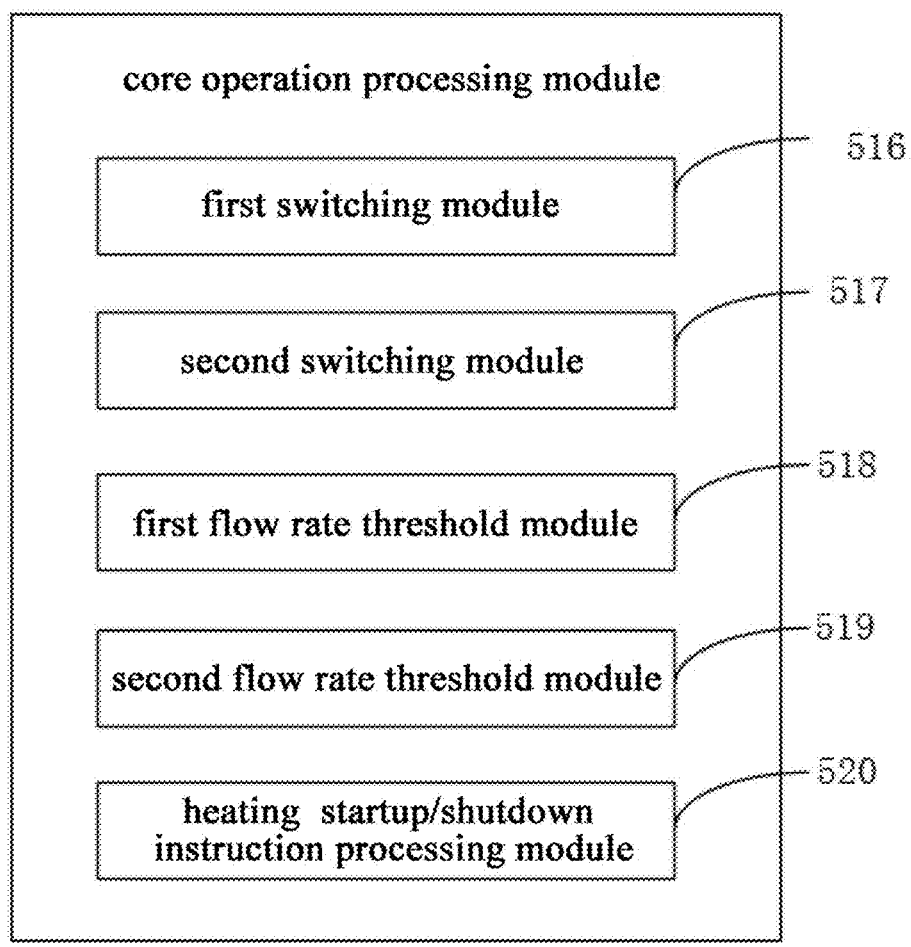
FIG. 9 is a diagram illustrating a seventh structure of a core operation module in a control system of a heat supply apparatus of a nuclear power plant provided according to an embodiment of the present disclosure.

In embodiments of the present disclosure, as shown in FIG. 9, the core operation module 5 further includes: a first flow rate threshold module 518, a second flow rate threshold module 519, and a heating startup/shutdown instruction processing module 520.

The first flow rate threshold module 518 is configured to compare a magnitude of the measured heating steam extraction flow rate with a preset threshold in the first flow rate threshold module 518, and transmit an instruction for switching from the load curve 1 to the load curve 2 to the first switching module 516 when the measured heating steam extraction flow rate is greater than the preset threshold.

The second flow rate threshold module 519 is configured to compare the magnitude of the measured heating steam extraction flow rate with a preset threshold in the second flow rate threshold module 519, and transmit an instruction for switching from the load curve 2 to the load curve 3 to the second switching module 517 when the measured heating steam extraction flow rate is greater than the preset threshold.

The heating startup/shutdown instruction processing module 520 is configured to determine, based on a heating startup/shutdown instruction transmitted from an operator, whether the heat supply apparatus satisfies a heating startup condition, and transmit the heating startup instruction when it is satisfied.

In summary, the control system provided by the embodiments of the present disclosure optimizes and improves the control method of the manual heat supply apparatus, realizes the intelligent regulation of the heat supply and steam extraction related system equipment, and may improve the degree of automation, and meanwhile, by the non-disturbance switching of the multiple operation control curves, the disturbance of parameters of a loop due to the change in turbine loads during the heating operation may be avoided, so as to improve the safety and reliability of the operation of a nuclear power unit during the heat supply.

EXAMPLE 2

Figure 10:
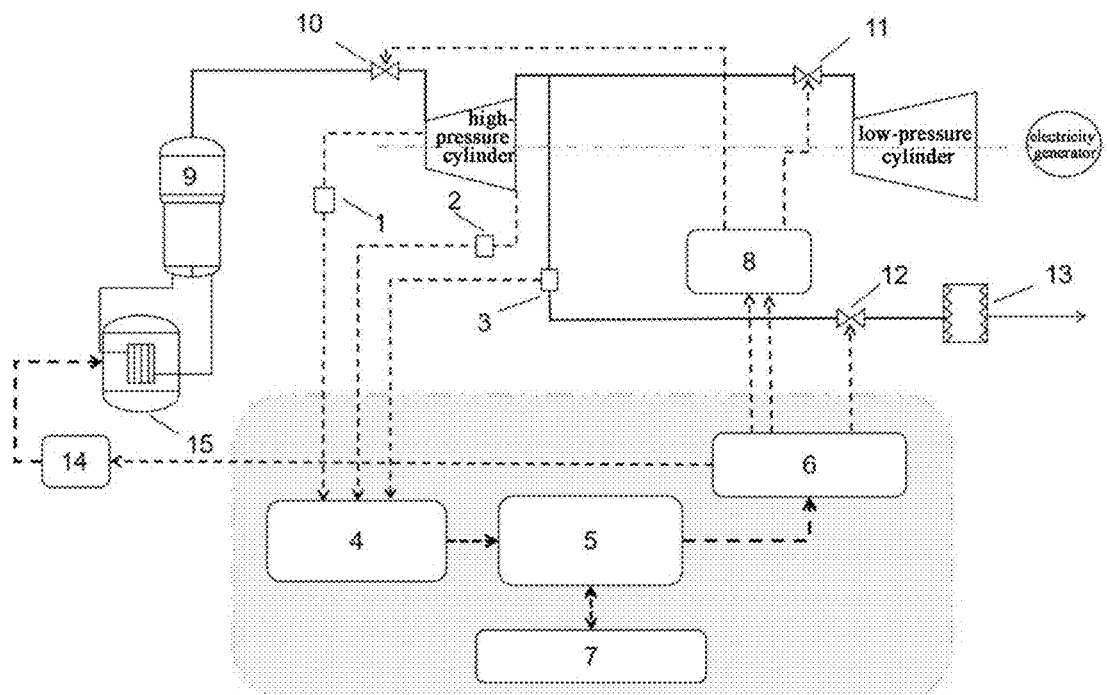
FIG. 10 is a diagram illustrating a structure of a specific application of a control system for a heat supply apparatus of a nuclear power plant provided according to an embodiment of the present disclosure.

Based on the system provided in Example 1 above, the present embodiment illustrates a process of controlling a steam extraction fast control valve (FCV) 12, a turbine high-pressure cylinder inlet governing valve (GV) 10, and a turbine low-pressure cylinder interceptor valve (ICV) 11 in a heat supply apparatus, including: as shown in FIG. 10, firstly, measuring a first-stage pressure of a turbine by a first-stage pressure measurement means 1, and measuring a turbine high-pressure cylinder exhaust pressure by a high-exhaust pressure measurement means 2, measuring a heating steam extraction flow rate by a steam extraction heating flow rate measurement means 3; secondly, acquiring and transmitting the measured data by a data acquisition module 4 to a core operation processing module 5; and then, receiving by the core operation processing module 5 signals transmitted from the data acquisition module 4, and then generating, based on the received signals, and transmitting action instructions for the steam extraction fast control valve (FCV) 12, the turbine high-pressure cylinder inlet governing valve (GV) 10, and the turbine low-pressure cylinder interceptor valve (ICV) 11 to a signal output module 6; and transmitting, by the output module 6, the action instruction for the steam extraction fast control valve (FCV) 12 to the steam extraction fast control valve (FCV) 12 for a valve control. The process further includes: receiving and displaying, by the human-machine interface processing module 7, the processed signals and information in the process of generating the action instructions transmitted from the core operation processing module 5; receiving and transmitting, by the signal output module 6, the action instructions transmitted from the core operation processing module 5 to the turbine controller 8 for controlling automatic increase or decrease of the electrical load to achieve heat-electricity linkage, or determining and transmitting a turbine load value using the received signals to the signal output module 6: transmitting the signals by the signal output module 6 to the reactor power control system 14, controlling, by the reactor power control system 14, a thermal power of the nuclear reactor 15 based on the received signals; and then heating up a nuclear island steam generator 9 by the primary loop coolant of the nuclear reactor 15 to generate steam, where main steam enters the high-pressure cylinder of the turbine unit through the turbine high-pressure cylinder inlet governing valve (GV) 10, and enters the low-pressure cylinder through the turbine low-pressure cylinder interceptor valve (ICV) 11, and then drives an electricity generator to generate electric power after doing work in the high-pressure and low-pressure cylinders, and where a part of exhaust steam from the high-pressure cylinder enters directly the heat network heater 13 after passing through a steam extraction pipeline and the fast control valve 12, and the heat network heater 13 heats the heating circulating water therein, ultimately heat supply to the external being achieved by the heated circulating water.

Figure 11:
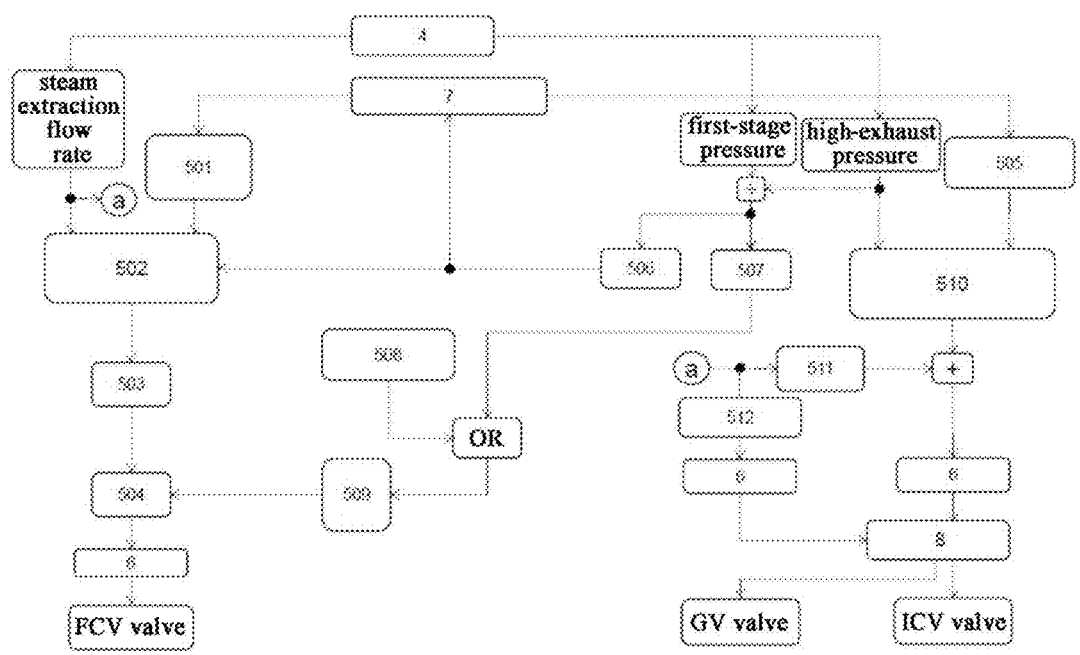
FIG. 11 is a detailed functional block diagram illustrating generating an action instruction for each valve in the heat supply apparatus through a core operation processing module in a control system of a heat supply apparatus of a nuclear power plant provided according to an embodiment of the present disclosure.

In an embodiment of the present disclosure, the core operation processing module 5 being configured to receive signals transmitted from the data acquisition module 4 and then generate, based on the signals, the action instructions for the steam extraction fast control valve (FCV) 12, the turbine high-pressure cylinder inlet governing valve (GV) 10, and the turbine low-pressure cylinder interceptor valve (ICV) 11 includes those as shown in FIG. 11, which shows a block diagram illustrating detailed functions within the core operation processing module 5 and depicts the detailed relationships between module 5 and modules 4, 6 and 7. Referring to FIG. 11, the module 5 undertakes crucial operation processing tasks, specifically, presetting flow rate set value in the steam extraction flow rate set value generation module 501 based on a heat network load demand or inputting a set value given by the operator through the human-machine interface module 7 into the steam extraction rate set value generation module 501, transmitting the flow rate set value from the steam extraction flow rate set value generation module 501 to the heating flow rate automatic regulator module 502 and inputting the steam extraction flow rate signal from the data acquisition module 4 to the heating flow rate automatic regulator module 502, inputting the steam extraction heating flow rate signal from the data acquisition module 4 is input to the heating flow rate automatic regulator module 502, where the heating flow rate automatic regulator module 502 may compare a deviation of the actual heating flow rate with the input set value from the steam extraction flow rate set value generation module 501, and perform PID (proportional integral-differential) operation according to the deviation, and the result is used as the action instruction for a FCV valve to control switching of the valve and thus regulate the heat supply steam flow rate. Meanwhile, the instruction for a valve position of the FCV is transmitted also through the manual/automatic module 503 and the override control module 504 on the way, and the manual/automatic switching function of the regulating loop is achieved through the manual automatic module 503, wherein when it is automatic, the instruction from the module 502 for regulating algorithm is outputted through the means, and when it is manual, the valve position of the FCV may be set by the operating personnel through the human-machine interface in order to realize the manual control of the valve.

Further, as shown in FIG. 11, when the override processing module 509 receives a signal transmitted from the override function triggering condition module 508, the override processing module 509 transmits a control instruction to the override control module 504, and in turn, the override control module 504 receives the control instruction transmitted from the override processing module 509 and transmits the received control instruction to the signal output module 6, and the signal output module 6 receives and transmits the control instruction to the steam extraction fast control valve (FCV) 12 for controlling of the steam extraction fast control valve (FCV) 12, wherein, the override function triggering condition includes: heating shutdown, turbine trip, and OPC action.

Meanwhile, as shown in FIG. 11, the module 505 is utilized to determine and transmit a set value of the high-exhaust pressure to the high-exhaust pressure regulator module 510, and the high-exhaust pressure regulator module 510 determines the deviation between the set value and the measured exhaust pressure of the turbine high-pressure cylinder, then performs a PID operation according to the deviation, and outputs a result to control an opening degree of the turbine low-pressure cylinder interceptor valve (ICV) 11 so as to maintain a requirement for the high-exhaust pressure in compliance with the given value. Specifically, a synthetic instruction based on adding an output of the control instruction from the high-exhaust pressure regulator module 510 to an output of the feedforward module 511 is transmitted to the output module 6 and is transmitted to turbine controller 8 through the output module 6 to control the opening degree of the turbine low-pressure cylinder interceptor valve (ICV) 11, wherein the set value of the high-exhaust pressure is determined by the high-exhaust pressure set value generation module 505 mainly based on the correspondence between the first-stage pressure (representing the load of the turbine) and the high-exhaust pressure, or based on the setting of the operator for the human-machine interface module 7.

It should be noted that, turbine load disturbances and valve mechanical wear may occur due to the frequent action of ICV, so it is needed to consider presetting a certain dead zone for the regulating of the high-exhaust pressure, where a specific size of the dead zone depends on an actual engineering situation and may be modified by the field testing.

It should be noted that, as shown in FIG. 11, the high-exhaust pressure is critical to the safety of nuclear turbine operation, especially final stage blades, and the present disclosure has designed additional protection loops in addition to the consideration of normal regulation control. In order to prevent fluctuations in the high-exhaust pressure caused by a rapid change in the regulation of the steam extraction flow rate of the FCV, a feedforward processing module 511 is added to speed up a response of the ICV; and meanwhile, a pressure-ratio protection loop is also considered, that is, the close of the FCV is realized by a first pressure-ratio low-pass threshold module 506 and a second pressure-ratio low-pass threshold module 507 to avoid a further deterioration of the operation conditions. Specifically, when a ratio of the measured exhaust pressure of the turbine high-pressure cylinder to the measured first-stage pressure signal is greater than a preset first pressure-ratio threshold, the first pressure-ratio low-pass threshold module 506 transmits, towards the heating flow rate automatic regulator module 502, a signal for closing the steam extraction fast control valve (FCV) 12 to the signal output module 6, and the signal output module 6 receives and transmits the signal for closing the steam extraction fast control valve (FCV) 12 to the steam extraction fast control valve (FCV) 12 to realize the slow close of the steam extraction control valve (FCV) 12; and when the ratio of the measured exhaust pressure of the turbine high-pressure cylinder to the measured first-stage pressure signal is greater than a preset second pressure-ratio threshold, the second pressure-ratio low-pass threshold module 507 transmits the signal for closing the steam extraction fast control valve (FCV) 12 to the override processing module 509 to realize the quick close of the steam extraction fast control valve (FCV) 12.

It should be noted that, as shown in FIG. 11, the value of the electrical load of the unit that needs to be automatically increased or decreased is calculated through the heating flow rate load compensation algorithm module 512 when the steam extraction flow rate changes, and is transmitted to the turbine controller 8 through the output module 6 to automatic increase or decrease of the electrical load for controlling the turbine high pressure control valve (GV) 10 to realize the heat-electricity linkage.

Figure 12:
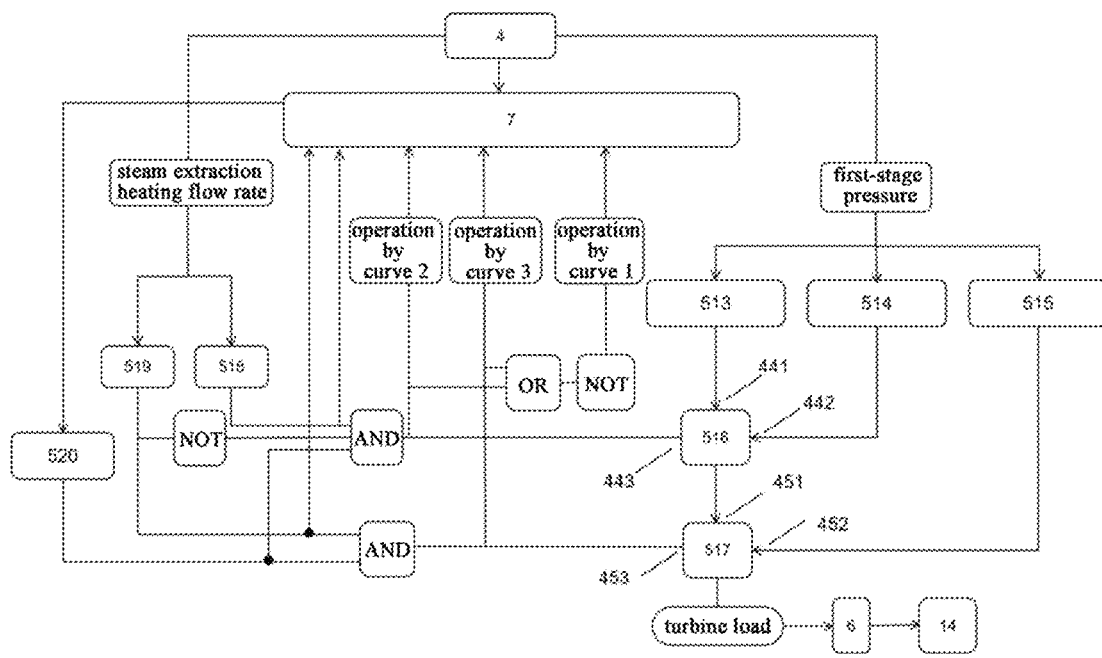
FIG. 12 is a detailed functional block diagram illustrating determining a turbine load value in the heat supply apparatus through a core operation processing module in a control system of a heat supply apparatus of a nuclear power plant provided according to an embodiment of the present disclosure.

In an embodiment of the present disclosure, based on the system provided in Example 1 above, this embodiment illustrates a process of determining a turbine load value in a heat supply apparatus and controlling the field equipment including, as shown in FIG. 12, firstly, measuring a first-stage pressure of a turbine by a first-stage pressure measurement means 1, and measuring a heating steam extraction flow rate by a steam extraction heating flow rate measurement means 3; and secondly, acquiring and transmitting, by a data acquisition module 4, the first-stage pressure and heating steam extraction flow rate to a core operation processing module 5; thirdly, receiving, by the core operation processing module 5, the first-stage pressure signal, the exhaust pressure of the turbine high-pressure cylinder and the steam extraction heating flow rate signal transmitted from the data acquisition module 4, determining a turbine load value by using the received signals, and transmitting the load value to a human-machine interface processing module 7 and a signal output module 6; then, receiving, by the human-machine interface processing module 7, the load value transmitted from the core operation processing module 5 for display, and receiving and transmitting, by the signal output module 6, the turbine load value transmitted from the core operation processing module 5 a reactor power control system 14: and finally, controlling, by the reactor power control system 14, a coolant for a nuclear reactor 15 based on the load value to enter into a steam generator 9, which serves as a connecting bridge between a primary loop and a secondary loop of the nuclear power plant (on a tube side of the steam generator is the primary loop for accommodating the reactor coolant, while on the other side is the secondary loop for the conventional island cooling water), wherein the coolant in the reactor takes away heat from the primary loop to cool the reactor core while heating up the water for the secondary loop in the steam generator, and main steam is generated at the outlet of the steam generator from the water for the secondary loop heated up in the steam generator, enters the high-pressure cylinder of the turbine unit to do work in the high-pressure cylinder and drive the electricity generator to generate electric power, and where a part of exhaust steam from the high-pressure cylinder enters directly the heat network heater 13 after passing through a steam extraction pipeline and the fast control valve 12, and the heat network heater 13 heats up the heating circulating water therein, ultimately heat supply to the external being achieved by the heated circulating water.

In an embodiment of the present disclosure, the core operation processing module 5 being configured to receive a first-stage pressure signal and a extraction heating flow rate signal transmitted from the data acquisition module 4, and to determine a turbine load value by using the received signals includes, those as shown in FIG. 12, which shows a block diagram illustrating detailed functions within the core operation processing module 5 and depicts the detailed relationships between the module 5 and the modules 4 and 7. Referring to FIG. 12, the module 5 undertakes the crucial operation processing task, where the first-stage pressure signal of the turbine from the data acquisition module 4 is transmitted simultaneously to the first curve module 513, the second curve module 514, and the third curve module 515, wherein a pure condensation curve, namely, curve 1, is set in the first curve module 513, a curve 2 is set in the second curve module 514, and a curve 3 is set in a third curve module 515. It should be noted that, among the three curves provided in this example, one curve represents the pure condensation curve (a relationship curve of the first-stage pressure versus the turbine load under pure condensation operation condition), and the other two curves represent relationship curves of the first-stage pressure versus the turbine load corresponding to two types of steam extraction flow rate operation conditions (e.g., 500t/h and 1,000t/h), wherein the selection of the steam extraction flow rate operation conditions needs to be determined by calculation through considering the influence of the maximum steam extraction capacity and the deviation of the load curve. The curve has an input as the first-stage pressure of the turbine and an output as the turbine load value from linear transform according to the curve.

Further, as shown in FIG. 12, the switching selection of the pure condensation curve and the curve 1 is performed by the first switching module 516, where the first input port 441 and the second input port 442 represent two inputs of the first switching module 516 (which come from the outputs of the two curves, respectively), and the first control port 443 is a control terminal of the first switching module 516, where the load value of the pure condensation curve may be outputted from the first switching module 516 when the first control port 443 is at a logic "0;, and the load value of the second curve module 514 may be outputted form the first switching module 516 when the first control port 443 is at a logic "1". In order to avoid the disturbance during the switching process between the first input port 441 and the second input port 442, the mutual tracking of the data from the two input ports may be realized by the first switching module 516 to ensure a disturbance-free in switching process. For example, when the first switching module 516 is operating at the first input port 441, the second input port 442 may automatically track the value of the first input port 441, and the first switching module 516 may be quickly switched from the first input port 441 to the second input port 442 to modulate once detecting the logic "1" at the first control port 443, where the output of the first switching module 516 remains unchanged at a moment of the switching since the second input port 442 has been tracking the value of the first input port 441, and may be slowly changed, at a preset rate (such as 5%/min, depending on an actual engineering situation), to a value of the second input port 442 from the first input port 441 after the switching; and vice versa.

Further, as shown in FIG. 12, the second switching module 517 operates in the same principle as the first switching module 516, wherein the second switching module 517 is configured to select whether the system operates in curve 2 or curve 3. The switching instructions for the first switching module 516 and the second switching module 517 come from the first flow rate threshold module 518 and the second flow rate threshold module 519, respectively, and the principle of generating of the switching instruction is explained by way of example as follows.

Figure 13:
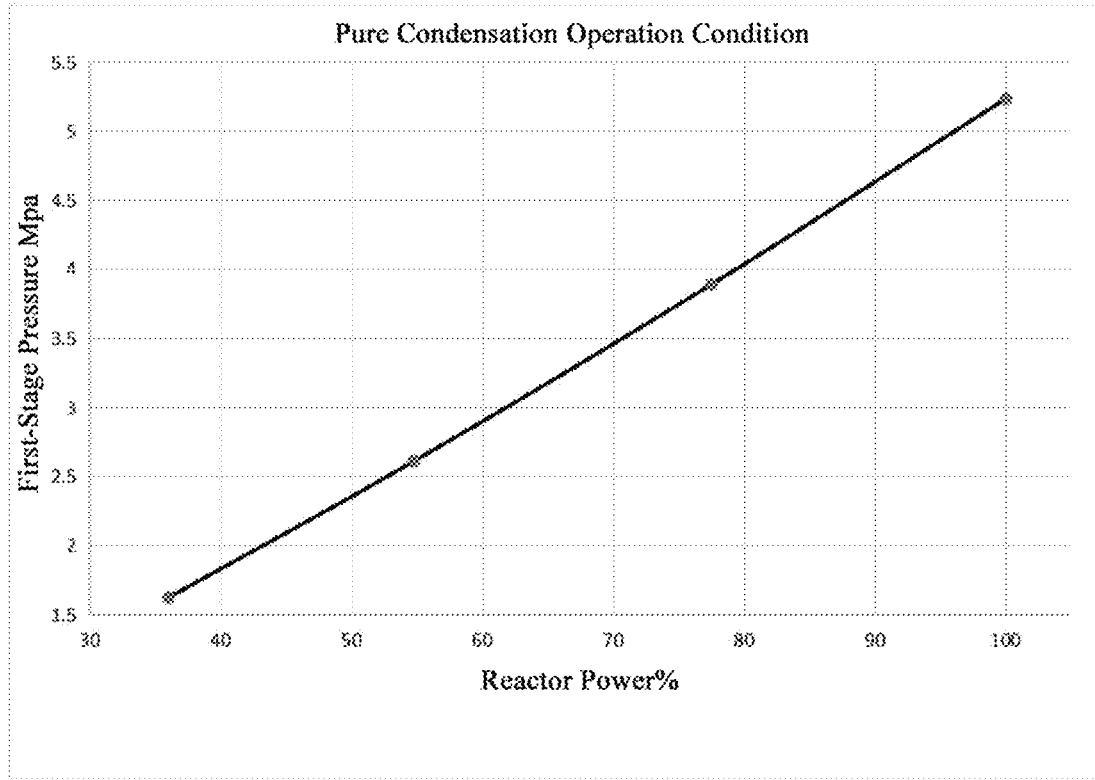
FIG. 13 is a graph of a relationship curve of a first-stage pressure versus a turbine load under a pure condensation operation condition in a reactor-turbine coordination control system for a steam extraction heating unit of a nuclear power plant provided according to an embodiment of the present disclosure.
Figure 14:
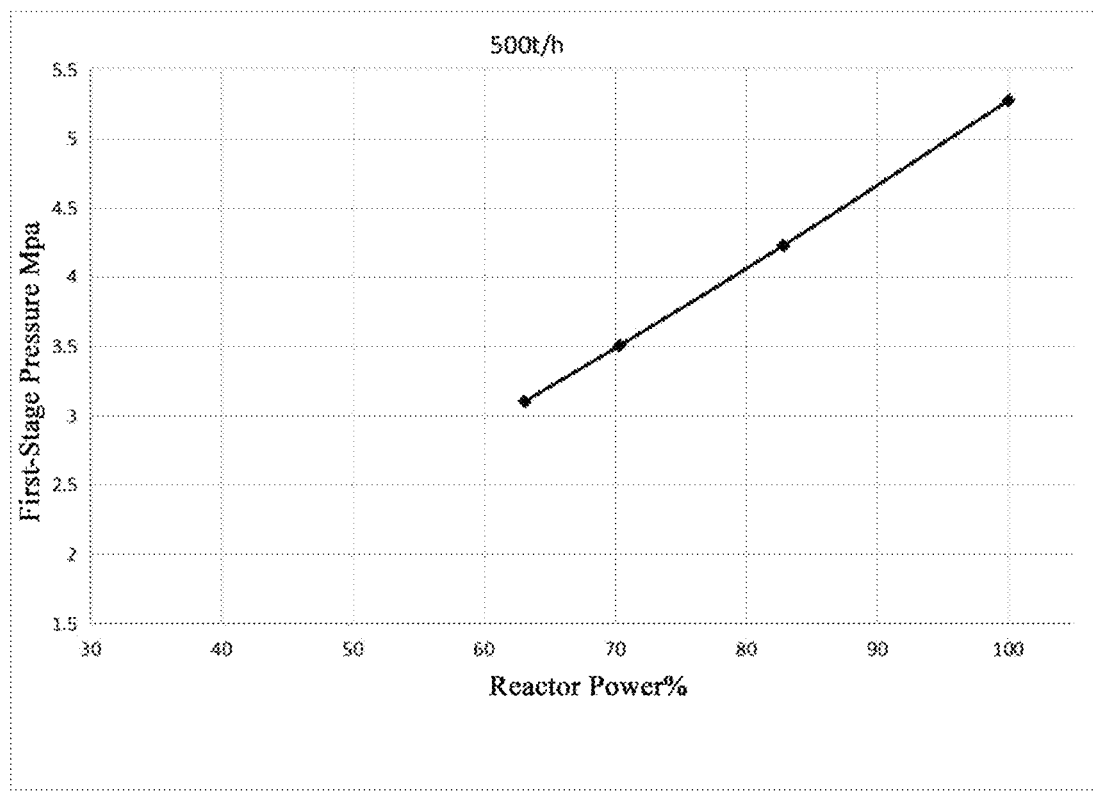
FIG. 14 is a graph of a relationship curve of a first-stage pressure versus a turbine load under a 500t/h operation condition in a reactor-turbine coordination control system for a steam extraction heating unit of a nuclear power plant provided according to an embodiment of the present disclosure.
Figure 15:
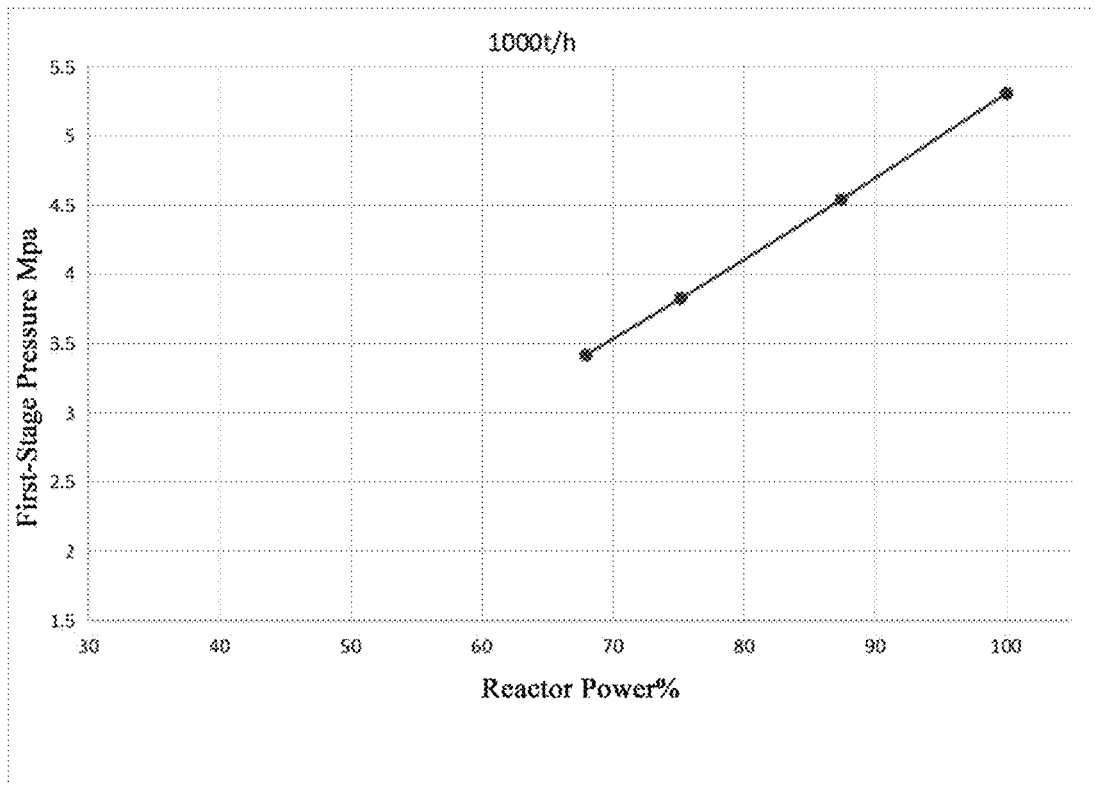
FIG. 15 is a curve of a relationship curve of a first-stage pressure versus a turbine load under a 1000t/h operation condition in a reactor-turbine coordination control system for a steam extraction heating unit of a nuclear power plant provided according to an embodiment of the present disclosure.

Assuming that the three curves are relationship curves of the first-stage pressure versus the turbine load corresponding to the pure condensation operation condition, steam extraction flow rate 500t/h and 1000t/h, respectively, as shown in FIG. 13, FIG. 14 and FIG. 15, where the first flow rate threshold module 518 may operate with a set value being greater than 250t/h, and the second flow rate threshold module 519 may operate with a set value being greater than 750t/h. The operation process is described as an example as follows. When the unit is put into steam extraction heating, firstly, the operator issues a heating startup/shutdown instruction through the human-machine interface module 7, and the heating instruction enters into the startup/shutdown instruction processing module 520 for further calculation and processing, wherein if the conditions of heating startup (ready) are satisfied, the startup/shutdown instruction processing module 520 outputs "1" indicating the heating start. When the steam extraction heating flow rate is less than 250t/h, neither of the first flow rate threshold module 518 and the second flow rate threshold module 519 operate, and the values of the first control port 443 and the second control port 453 are both "0", so that the first and second switching modules 516 and 517 output the values of the first and second input ports 441 and 451, respectively, and the turbine load value of the pure condensation curve is output; when the steam extraction heating flow rate is greater than 250t/h and less than 750t/h, the first flow rate threshold module 518 operates and outputs "1", and since the output of the startup shutdown instruction processing module 520 is also "1" at this time and "1" is also obtained from "NOT" operation on the second flow rate threshold module 519, "1" is outputted from "AND" logic gate after the first flow rate threshold module 518, and then the first control port 443 corresponding to the first switching module 516 is at "1", so that the first switching module 516 is switched from the first input port 441 to the second input port 442, i.e., from the pure condensation curve to the curve of 500t/h for operation; and similarly, when the steam extraction heating flow rate is greater than 750t/h, the second flow rate threshold module 519 outputs "1", and since the output of the startup/shutdown instruction processing module 520 at this time is also "1", "1" is also outputted from the "AND" logic gate after the second flow rate threshold module 519, and then the second control port 453 corresponding to the second switching module 517 is at "1", so that the output of the second switching module 517 is switched from the third input port 451 to the fourth input port 452, i.e., from the curve of 500t/h to the curve of 1000t/h for operation. In addition to automatically completing the selection of the load matching curve according to different steam extraction heating flow rates, the intelligent equipment is also capable of displaying in real time on the human-machine interface which curve the current system is operating on, which is convenient for the operator to monitor.

In summary, the control system provided by the embodiments of the present disclosure realizes intelligent regulation of the system equipment related to heating steam extraction, the high-pressure cylinder exhaust pressure and the turbine electric load, reducing the probability of human errors and improving the automation as well as the reliability and safety of the equipment operation; and furthermore, the system has a flexible regulation mode and a rapid response, making the operation of the heating unit safer, more efficient, and more economical. Additionally, the control system in this embodiment significantly reduces errors of the system operating parameter caused by the original single curve, and improves the stability of operation of the nuclear island system during the heating of the nuclear power unit Meanwhile, through the disturbance-free switching between multiple operation control curves, disturbance in the parameters of the primary loop of the reactor during the changing of the heat supply load is avoided, improving the safety and reliability of the operation of the nuclear power unit during the heating.

EXAMPLE 3

Figure 16:
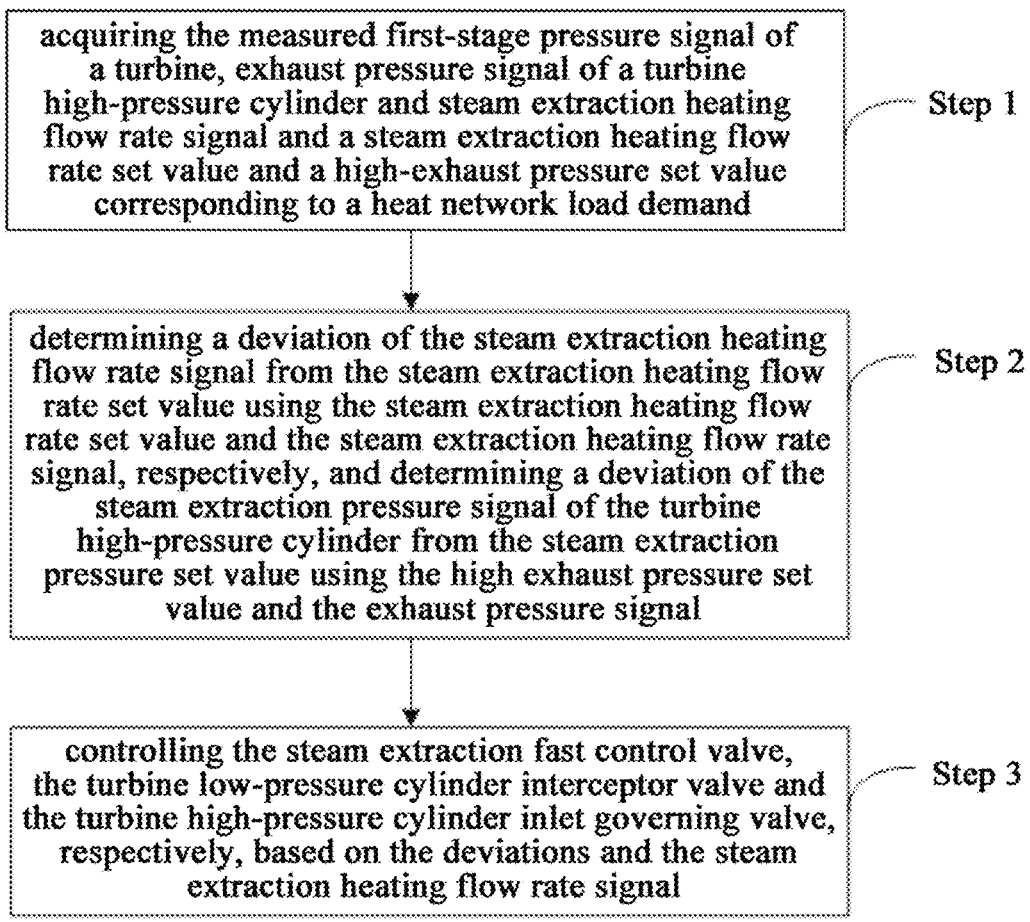
FIG. 16 is a flowchart of generating an action instruction for each valve in a control method for a heat supply apparatus of a nuclear power plant provided according to an embodiment of the present disclosure.

As shown in FIG. 16, a method of controlling a steam extraction fast control valve (FCV) 12, a turbine high-pressure cylinder inlet governing valve (GV) 10, and a turbine low-pressure cylinder interceptor valve (ICV) 11 in a heat supply apparatus based on a system provided in Example 2 includes:
  Step 1: acquiring the measured first-stage pressure signal of a turbine, an exhaust pressure signal of a turbine high-pressure cylinder and the steam extraction heating flow rate signal and a steam extraction heating flow rate set value and a high-exhaust pressure set value corresponding to a heat network load demand;
  Step 2: determining a deviation of the steam extraction heating flow rate signal from the steam extraction heating flow rate set value using the steam extraction heating flow rate set value and the steam extraction heating flow rate signal, respectively, and determining a deviation of the steam extraction pressure signal of the turbine high-pressure cylinder from the steam extraction pressure set value using the high-exhaust pressure set value and the exhaust pressure signal:
  Step 3: controlling the steam extraction fast control valve (FCV) 12, the turbine low-pressure cylinder interceptor valve (ICV) 11 and the turbine high-pressure cylinder inlet governing valve (GV) 10, respectively, based on the deviations and the steam extraction heating flow rate signal.

In embodiments of the present disclosure, the controlling the steam extraction fast control valve (FCV) 12, the turbine low-pressure cylinder interceptor valve (ICV) 11 and the turbine high-pressure cylinder inlet governing valve (GV) 10, respectively, based on the deviations and the extraction heating flow rate signal, includes:

controlling the steam extraction fast control valve (FCV) 12 based on the deviation of the steam extraction heating flow rate signal from the steam extraction heating flow rate set value:
  controlling the turbine low-pressure cylinder interceptor valve (ICV) 11 based on the deviation of the exhaust pressure signal from the high-exhaust pressure set value:
  controlling the turbine high-pressure cylinder inlet governing valve (GV) 10 by determining a value of an electrical load of the turbine unit to be automatically increased or decreased based on the steam extraction heating flow rate signal.

In summary, the control method provided by the embodiments of the present disclosure realizes intelligent regulation of the system equipment related to heating steam extraction, the high-pressure cylinder exhaust pressure and the turbine electrical load, reduces the probability of human error in manual operation, improves the automation as well as the reliability and safety of the equipment operation, and the system is regulated in a flexible manner with a fast response, making the operation of the heating unit safer, more efficient, and more economical.

EXAMPLE 4

Figure 17:
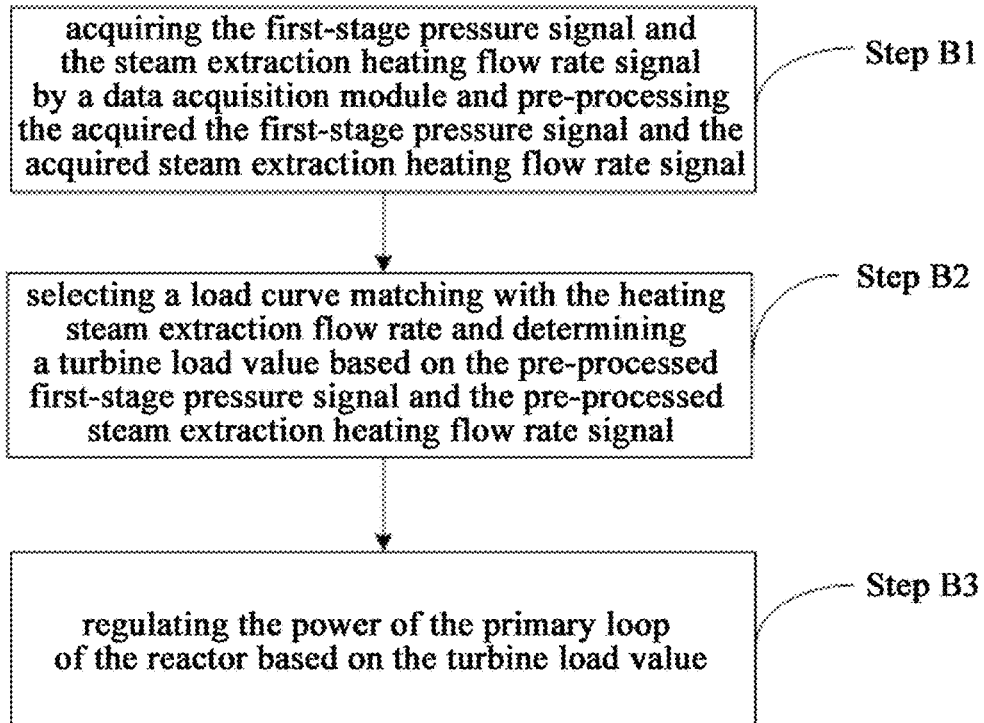
FIG. 17 is a flow rate chart of determining a turbine load value in a control method for a heat supply apparatus of a nuclear power plant according to an embodiment of the present disclosure.

As shown in FIG. 17, a method of controlling a turbine load in a heat supply apparatus based on the system provided in Example 2 includes:
  Step B1: acquiring the first-stage pressure signal and the steam extraction heating flow rate signal by a data acquisition module 4 and pre-processing the acquired the first-stage pressure signal and the acquired steam extraction heating flow rate signal:
  Step B2: selecting a load curve matching with the heating steam extraction flow rate and determining a turbine load value based on the pre-processed first-stage pressure signal and the pre-processed steam extraction heating flow rate signal;
  Step B3: regulating the power of the primary loop of the reactor based on the turbine load value.

In embodiments of the present disclosure, the selecting a load curve matching with the heating steam extraction flow rate and determining a turbine load value based on the acquired and pre-processed turbine first-stage pressure signal and steam extraction heating flow rate signal includes:
  determining a switching instruction outputted from a threshold module based on a preset threshold value of the heating steam extraction flow rate and a magnitude of the acquired heating steam extraction flow rate signal:
  selecting a load curve matching with the heating steam extraction flow rate based on the switching instruction and determining the turbine load value corresponding to the first-stage pressure signal.

In embodiments of the present disclosure, the load curve is determined based on the operation conditions of the heating steam extraction flow rate.

In summary, the control method provided by the present embodiment reduces operational parameter errors of the system and improves the stability of the nuclear island system operation of the nuclear power unit during the heating period. Meanwhile, through the disturbance-free switching between the multiple operating control curves, the disturbance in the parameters of the primary loop of the reactor during changing of the heat supply load is avoided, improving the safety and reliability of the operation of the nuclear power unit during the heating.

In the description of the present specification, reference to the terms "an embodiment", "some embodiments", "examples", "specific examples", or "some examples" means that the specific features, structures, materials, or characteristics described in conjunction with the embodiment or example are included in at least one embodiment or example of the present disclosure.", In this specification, schematic expressions of the above terms do not necessarily refer to the same embodiment or example. Moreover, the specific features, structures, materials, or characteristics described may be combined in any one or more embodiments or examples in a suitable manner. Furthermore, without contradicting each other, those skilled in the art may incorporate and combine different embodiments or examples and features of different embodiments or examples described in this specification.

Any process or method description depicted in the flowchart or otherwise described herein may be understood to represent a module, fragment, or portion of code including one or more executable instructions for implementing the steps of a customized logic function or process, and the scope of the preferred embodiments of the present disclosure includes additional implementations which may be implemented in a manner other than in the order shown or discussed, including performing functions in accordance with the functions involved in a substantially simultaneous or in reverse order, according to the functions involved, as should be understood by one of skill in the art to which the embodiments of the present disclosure belong.

Although embodiments of the present disclosure have been illustrated and described above, it is to be understood that the above embodiments are exemplary and are not to be construed as a limitation of the present disclosure, and that one of ordinary skill in the art may make changes, modifications, substitutions, and variations of the above embodiments within the scope of the present disclosure.

What is claimed is:

1. A control system for a heat supply apparatus of a nuclear power plant, comprising:
    a first-stage pressure measurement means configured for measuring a first-stage pressure of a turbine to obtain a first-stage pressure signal;
    a high-exhaust pressure measurement means configured for measuring an exhaust pressure of a turbine high-pressure cylinder to obtain an exhaust pressure signal;
    a steam extraction heating flow rate measurement means configured for measuring a steam extraction heating flow rate to obtain a steam extraction heating flow rate signal;
    a data acquisition module configured for acquiring and transmitting the measured first-stage pressure signal, the measured exhaust pressure signal and the measured steam extraction heating flow rate signal to a core operation processing module;
    the core operation processing module configured for receiving the first-stage pressure signal, the exhaust pressure signal and the steam extraction heating flow rate signal transmitted from the data acquisition module, and generating an action instruction for each of valves in the heat supply apparatus based on the first-stage pressure signal, the exhaust pressure signal and the steam extraction heating flow rate signal or determining a turbine load value using the received signal, and transmitting the action instruction or the turbine load value to a signal output module; and
    the signal output module configured for receiving and transmitting the action instruction or the turbine load value from the core operation processing module to a field equipment for control,
    wherein the core operation processing module comprises:
    a steam extraction flow rate set value generation module configured for transmitting, to a heating flow rate automatic regulator module, a flow rate set value preset according to a heat network load demand or a set value given by an operator through the human-machine interface module;
    the heating flow rate automatic regulator module configured for receiving the set value transmitted from the steam extraction flow rate set value generation module and determining a deviation of the measured steam extraction heating flow rate from the set value, and then performing a proportional integral-differential (PID) operation based on the deviation and transmitting an operation result to a manual/automatic module; and
    the manual/automatic module configured for receiving the operation result transmitted from the automatic heating flow rate regulator module and controlling a steam extraction fast control valve (FCV) in the heat supply apparatus based on the operation result.

2. The control system for the heat supply apparatus of the nuclear power plant as claimed in claim 1, further comprising:
    a human-machine interface processing module configured for performing information interaction with the core computing processing module,
    wherein the information interaction includes: manual operation instructions, set value input, signal display, alarm processing, and function startup/shutdown, during core operation processing.

3. The control system for the heat supply apparatus of the nuclear power plant as claimed in claim 2, wherein before the generating the action instruction for the each of valves in the heat supply apparatus based on the first-stage pressure signal, the exhaust pressure signal and the steam extraction heating flow rate signal or determining the turbine load value using the received signals, further comprising:
    preprocessing the received first-stage pressure signal, the received exhaust pressure signal and the received steam extraction heating flow rate signal,
    wherein the pre-processing comprises: performing two-out-of-three redundancy processing on the first-stage pressure signal, the exhaust pressure signal and the steam extraction heating flow rate signal acquired by multiple channels, respectively, and determining whether a range corresponding to the acquired signal exceeds a preset range and determining whether a value of the acquired signal is greater than a preset signal threshold, and transmitting an alarm signal to the human-machine interface processing module when the range corresponding to the acquired signal exceeds the preset range or the value of the acquired signal is greater than the preset signal threshold, an alarm signal being transmitted to the human-machine interface processing module when the range corresponding to the acquired signal exceeds the preset range or the value of the acquired signal is greater than the preset signal threshold.

4. The control system for the heat supply apparatus of the nuclear power plant as claimed in claim 2, wherein the core operation processing module further comprises:
    a high-exhaust pressure set value generation module configured for transmitting, to the high-exhaust pressure regulator module, a high-exhaust pressure set value preset according to the design requirements of the turbine or a set value given by the operator through the human-machine interface module; and a high-exhaust pressure regulator module configured for receiving the measured exhaust pressure of the turbine high-pressure cylinder and the exhaust pressure set value transmitted from the high-exhaust pressure set value generation module, and determining a deviation of the measured exhaust pressure from the set value, and then performing a PID operation according to the deviation to obtain an operation result, and controlling the turbine low-pressure cylinder interceptor valve (ICV) based on the operation result.

5. The control system for the heat supply apparatus of the nuclear power plant as claimed in claim 1, wherein the core operation processing module further comprises:

a first pressure-ratio low-pass threshold module configured for comparing a ratio of the measured exhaust pressure of the turbine high-pressure cylinder to the measured first-stage pressure signal with a preset first pressure-ratio threshold, and transmitting a signal for closing the steam extraction fast control valve to the heating flow rate automatic regulator module when the ratio of the measured exhaust pressure of the turbine high-pressure cylinder to the measured first-stage pressure signal is greater than the preset first pressure-ratio threshold, to realize a close of the steam extraction fast control valve;

a second pressure-ratio low-pass threshold module configured for comparing the ratio of the measured exhaust pressure of the turbine high-pressure cylinder to the measured first-stage pressure signal with a preset second pressure-ratio threshold, and transmitting a signal for closing the steam extraction fast control valve to an override processing module when the ratio of the measured exhaust pressure of the turbine high-pressure cylinder to the measured first-stage pressure signal is greater than the preset second pressure-ratio threshold, to realize a quick close of the steam extraction fast control valve;

the override processing module configured for transmitting a control instruction to an override control module when receiving a signal transmitted from an override function triggering condition module, wherein an override function triggering condition includes: heating shutdown, turbine trip, and OPC action; and the override control module, arranged at an input end of the steam extraction fast control valve, configured for receiving the control instruction transmitted from the override processing module and controlling the steam extraction fast control valve based on the control instruction.

6. The control system for the heat supply apparatus of the nuclear power plant as claimed in claim 4, wherein the core operation processing module further comprises:

a feedforward module configured for reacting in advance to changes in the measured steam extraction heating flow rate, so that the turbine low-pressure cylinder interceptor valve (ICV) operates in advance in order to quickly regulate the high-exhaust pressure.

7. The control system for the heat supply apparatus of the nuclear power plant as claimed in claim 1, wherein the core operation processing module further comprises:

a heating flow rate load compensation algorithm module configured for calculating and generating a control instruction and automatically increasing or decreasing an electrical load of a unit while the heat supply is regulated while a total turbine load remaining unchanged, wherein the increasing or decreasing of the electrical load is performed by a turbine controller to modulate the turbine high pressure control valve (GV).

8. The control system for the heat supply apparatus of the nuclear power plant as claimed in claim 1, wherein the core operation module further comprises:

a first curve module, in which a pre-obtained load curve 1 is set, configured for determining the turbine load value corresponding to the measured first-stage pressure based on the load curve 1;

a second curve module, in which a pre-obtained load curve 2 is set, configured for determining the turbine load value corresponding to the measured first-stage pressure based on the load curve 2;

a third curve module, in which a pre-obtained load curve 3 is set, configured for determining the turbine load value corresponding to the measured first-stage pressure based on the load curve 3;

a first switching module configured for receiving a switching signal and performing a switching between the pre-obtained load curve 1 and the pre-obtained load curve 2; and a second switching module configured for receiving a switching signal and performing a switching between the pre-obtained load curve 2 and the pre-obtained load curve 3, wherein a number of the load curves is determined based on the types of operation conditions of the heating steam extraction flow rate.

9. The control system for the heat supply apparatus of the nuclear power plant as claimed in claim 8, wherein the core operation module further comprises:

a first flow rate threshold module configured for transmitting an instruction for switching from the load curve 1 to the load curve 2 to the first switching module when the measured heating steam extraction flow rate is greater than a preset threshold in the first flow rate threshold module, based on comparing of the magnitude of the measured heating steam extraction flow rate with the pre-set threshold;

a second flow rate threshold module configured for transmitting an instruction for switching from the load curve 2 to the load curve 3 to the second switching module when the measured heat extraction flow rate is greater than a pre-set threshold in the second flow rate threshold module, based on comparing of the magnitude of the measured heat extraction flow rate with the pre-set threshold; and a heating startup/shutdown instruction processing module configured for determining, based on a heating startup/shutdown instruction transmitted from an operator, whether the heat supply apparatus satisfies a heating startup condition, and transmitting the heating startup instruction when it is satisfied.

10. The control system for the heat supply apparatus of the nuclear power plant as claimed in claim 8, wherein the first switching module and the second switching module are further configured for realizing mutual automatic tracking of the load curves before and after the switching;

a number of the flow rate threshold modules corresponds to a number of the switching modules; and wherein the number of the flow rate threshold modules is determined based on the types of the operation conditions of the heating steam extraction flow rate.

11. A control method for a heat supply apparatus of a nuclear power plant based on the control system for the heat supply apparatus of the nuclear power plant as claimed in claim 1, comprising:

- acquiring a measured first-stage pressure signal of a turbine, a measured exhaust pressure signal of a turbine high-pressure cylinder, and a measured steam extraction heating flow rate signal and a steam extraction heating flow rate set value and a high-exhaust pressure set value corresponding to a heat network load demand;
- determining a deviation of the steam extraction heating flow rate signal from the steam extraction heating flow rate set value using the steam extraction heating flow rate set value and the steam extraction heating flow rate signal, respectively, and determining a deviation of the steam extraction pressure signal of the turbine high-pressure cylinder from the steam extraction pressure set value using the high-exhaust pressure set value and the exhaust pressure signal; and
- controlling a steam extraction fast control valve, a turbine low-pressure cylinder interceptor valve and a turbine high-pressure cylinder inlet governing valve, respectively, based on the deviations and the steam extraction heating flow rate signal.

12. A control method for a heat supply apparatus of a nuclear power plant based on the control system for the heat supply apparatus of the nuclear power plant as claimed in claim 1, comprising:

- acquiring the first-stage pressure signal and the steam extraction heating flow rate signal by a data acquisition module and pre-processing the acquired the first-stage pressure signal and the acquired steam extraction heating flow rate signal;
- selecting a load curve matching with the heating steam extraction flow rate and determining a turbine load value based on the pre-processed first-stage pressure signal and the pre-processed heating steam extraction flow rate signal; and
- regulating a power of a reactor based on the turbine load value.

13. A control method for a heat supply apparatus of a nuclear power plant based on the control system for the heat supply apparatus of the nuclear power plant as claimed in claim 8, comprising:

- acquiring the first-stage pressure signal and the steam extraction heating flow rate signal by a data acquisition module and pre-processing the acquired the first-stage pressure signal and the acquired steam extraction heating flow rate signal;
- selecting a load curve matching with the heating steam extraction flow rate and determining a turbine load value based on the pre-processed first-stage pressure signal and the pre-processed heating steam extraction flow rate signal; and
- regulating a power of a reactor based on the turbine load value.

* * * * *